(12) United States Patent
Rogers et al.

(10) Patent No.: US 8,925,008 B2
(45) Date of Patent: *Dec. 30, 2014

(54) METHOD AND APPARATUS FOR STORAGE AND INSERTION OF ADVERTISEMENTS

(71) Applicant: AT&T Intellectual Property I, L.P., Atlanta, GA (US)

(72) Inventors: James M. Rogers, San Jose, CA (US); William C. Versteeg, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/173,244

(22) Filed: Feb. 5, 2014

(65) Prior Publication Data

US 2014/0157310 A1 Jun. 5, 2014

Related U.S. Application Data

(60) Continuation of application No. 13/546,141, filed on Jul. 11, 2012, now Pat. No. 8,683,513, and a continuation of application No. 11/828,492, filed on Jul. 26, 2007, now Pat. No. 8,302,123, and a division of application No. 09/750,105, filed on Dec. 29, 2000, now abandoned.

(51) Int. Cl.
| | |
|---|---|
| *H04N 7/10* | (2006.01) |
| *H04N 7/025* | (2006.01) |
| *H04N 21/81* | (2011.01) |
| *H04N 7/16* | (2011.01) |
| *H04N 21/432* | (2011.01) |
| *H04N 21/458* | (2011.01) |
| *H04N 21/45* | (2011.01) |

(52) U.S. Cl.
CPC ............. *H04N 21/812* (2013.01); *H04N 7/162* (2013.01); *H04N 21/432* (2013.01); *H04N 21/458* (2013.01); *H04N 21/4532* (2013.01)
USPC .................. 725/35; 725/32; 725/34; 348/461; 705/14.69

(58) Field of Classification Search
CPC ............. H04N 21/432; H04N 21/458; H04N 21/4532; H04N 21/812
See application file for complete search history.

(56) References Cited

U.S. PATENT DOCUMENTS

| | | |
|---|---|---|
| 5,155,591 A | 10/1992 | Wachob |
| 5,283,639 A | 2/1994 | Esch et al. |
| 5,424,770 A | 6/1995 | Schmelzer et al. |
| 5,446,919 A | 8/1995 | Wilkins |
| 5,646,675 A | 7/1997 | Copriviza et al. |
| 5,774,170 A | 6/1998 | Hite et al. |
| 5,835,087 A | 11/1998 | Herz et al. |
| 6,002,393 A | 12/1999 | Hite et al. |
| 6,029,045 A | 2/2000 | Picco et al. |

(Continued)

*Primary Examiner* — Joshua Taylor
(74) *Attorney, Agent, or Firm* — Toler Law Group, PC

(57) ABSTRACT

A method includes detecting a substitution signal at a device and inserting an advertisement into a media stream in response to detecting the substitution signal. The advertisement is selected based on an advertising fee associated with insertion of the advertisement into the media stream. The advertising fee is a first fee when the advertisement is a local advertisement for a provider of a product or service and the advertisement is to be inserted at a first location in the media stream that follows a national advertisement for the product or service. The first fee is distinct from a second fee that is associated with insertion of the local advertisement at a second location in the media stream.

20 Claims, 6 Drawing Sheets

(56) References Cited

U.S. PATENT DOCUMENTS

| | | |
|---|---|---|
| 6,057,872 A | 5/2000 | Candelore |
| 6,078,412 A | 6/2000 | Fuse et al. |
| 6,177,931 B1 | 1/2001 | Alexander et al. |
| 6,182,050 B1 | 1/2001 | Ballard |
| 6,286,005 B1 | 9/2001 | Cannon |
| 6,459,906 B1 | 10/2002 | Yang |
| 6,493,709 B1 | 12/2002 | Aiken |
| 6,698,020 B1 | 2/2004 | Zigmond et al. |
| 6,704,930 B1 | 3/2004 | Eldering et al. |
| 6,708,335 B1 | 3/2004 | Ozer et al. |
| 6,766,524 B1 | 7/2004 | Matheny et al. |
| 6,876,974 B1 | 4/2005 | Marsh et al. |
| 7,006,606 B1 | 2/2006 | Cohen et al. |
| 7,343,614 B1 | 3/2008 | Hendricks et al. |
| 8,302,123 B2 | 10/2012 | Rogers et al. |
| 2002/0069105 A1 | 6/2002 | do Rosario Botelho et al. |
| 2002/0095676 A1 | 7/2002 | Knee et al. |
| 2003/0149601 A1 | 8/2003 | Cabral |
| 2005/0097594 A1 | 5/2005 | O'Donnell et al. |
| 2005/0166224 A1 | 7/2005 | Ficco |
| 2012/0278823 A1 | 11/2012 | Rogers et al. |

Figure 4

| Commercial ID | Type of Commercial | Length | Sponsor | Frequency | Tally | Expiration |
|---|---|---|---|---|---|---|
| 19835421 | Automotive Company | 30s | Ford | 60% | 15 | 3/3/01 |
| 293525 | Financial Services Company | 30s | American Express | 10% | 3 | 10/9/00 |
| 92543265 | Toilet Cleaning Products | 15s | 2000 Flushes | 3% | 2 | 12/9/01 |
| 625392 | Paper Tissue | 15s | Downey | 12% | 6 | 3/5/01 |
| 254396582 | Brake Service | 15s | Midas | 16% | 8 | 3/9/01 |
| 6958945 | Cruise Ship | 30s | Princess | 20% | 3 | 2/9/01 |
| 1239547 | Laptop Computers | 15s | Dell | 10% | 4 | 2/5/01 |
| 9548920 | Tires | 15s | Michelin | 20% | 5 | 3/9/01 |

METHOD AND APPARATUS FOR STORAGE AND INSERTION OF ADVERTISEMENTS

CLAIM OF PRIORITY

The present application claims priority from and is a continuation application of U.S. patent application Ser. No. 13/546,141, filed on Jul. 11, 2012 and entitled "METHOD AND APPARATUS FOR STORAGE AND INSERTION OF ADVERTISEMENTS," which is a continuation application of U.S. patent application Ser. No. 11/828,492, filed on Jul. 26, 2007, issued as U.S. Pat. No. 8,302,123, and entitled "METHOD AND APPARATUS FOR LOCAL STORAGE AND INSERTION OF TELEVISION COMMERCIALS," which is a divisional application of U.S. patent application Ser. No. 09/750,105, filed on Dec. 29, 2000 and entitled "METHOD AND APPARATUS FOR LOCAL STORAGE AND INSERTION OF TELEVISION COMMERCIALS," the contents of each of which are incorporated herein by reference in their entirety.

FIELD OF THE DISCLOSURE

The present disclosure relates to inserting advertisements into a media stream.

BACKGROUND

Since the origin of home television in the 1940's, a primary source of revenue for television networks has been through paid advertisements that are interspersed between television programming of entertainment or news information as "commercials" for products and services. Typically 15 to 60 seconds in length, television commercials are grouped together as pre-defined breaks in the broadcast of a television show, occurring after every few minutes of television programming. It is known that in every one hour of television programming, there are approximately sixteen (16) minutes of commercials. The number of commercials and the timing between placement of the commercials are often dependent upon the type of television show (i.e., sporting event, game show, movie, or sitcom) or the format of the program (i.e., live or pre-recorded).

Television advertising is generally more effective when aired during popular television programs that are watched by many viewers who are interested in buying the types of products or services that are advertised. In determining whether a television program may be appropriate for particular advertisements, advertisers typically consider whether the program attracts large numbers of viewers who are in the same age group, gender, and income level, and have similar interests with those who tend to purchase the products to be advertised. Selecting the placement of advertising in this manner increases the likelihood that viewers who watch the advertisement will be interested in or may otherwise influence household purchasing decisions concerning products advertised during the program.

Although the process of selecting advertisements for television programs according to viewer demographics can be effective, broadcast television commercial advertising remains inherently inefficient because the same advertisement is shown to the entire audience of a television program. For example, while some viewers of a television game show program may be interested in a television commercial for a convertible automobile, others may be more interested in an advertisement for a minivan or sport utility vehicle. Because a single commercial advertisement cannot be tailored to the unique interests of each individual viewer, the advertisements are usually of little interest to a significant portion of the viewers. As a consequence, commercial advertisements are often disregarded by a large percentage of viewers.

Television networks typically reserve a portion of advertising time slots for local television stations to run advertisements for local businesses or public service announcements that affect the local television audience. In the present broadcast system, the same local advertisement is played to all recipients of the television broadcast signal, regardless of the viewers' particular locations within the broadcast area. In many circumstances, this method of local advertising is inefficient because a local advertisement only applies to viewers in one portion of the broadcast area. For example, although a television station may broadcast commercials to all viewers within a fifteen-mile radial distance of the broadcast tower, a commercial for an automobile dealership that is fifteen miles north of the television station may be irrelevant to a viewer who is located fifteen miles south of the television station. It is highly unlikely that the viewer will buy an automobile from the advertised dealership if there are many other dealerships that are more conveniently located. Accordingly, the inability to target advertisements to viewers according to location within a local broadcast area reduces the effectiveness and thereby increases the cost of local television advertising.

BRIEF DESCRIPTION OF THE DRAWINGS

FIG. 4 is an illustrative embodiment of a table of a header database in a memory of a set top box;

DETAILED DESCRIPTION

The disclosed system provides a set top box that stores a plurality of television commercials for products or services that have been found to be of interest to viewers in a household that uses the set top box. At commercial breaks during the broadcast of network television programs, the television network indicates when the set top box is authorized to insert a stored television commercial instead of a broadcast commercial. If the set top box locates a locally stored commercial that is appropriate for the television program and the user, the commercial is inserted into the commercial break. In this manner, the television commercials can be selected to correlate more closely with the viewer's interests or location, thereby improving the efficiency and effectiveness of commercial advertising.

A particular embodiment of the present disclosure provides a set top box for a cable television or satellite television system that stores television commercials in a local memory and periodically inserts commercials during commercial breaks that have been determined to be pertinent to a viewer's individual interests.

Figure 1:
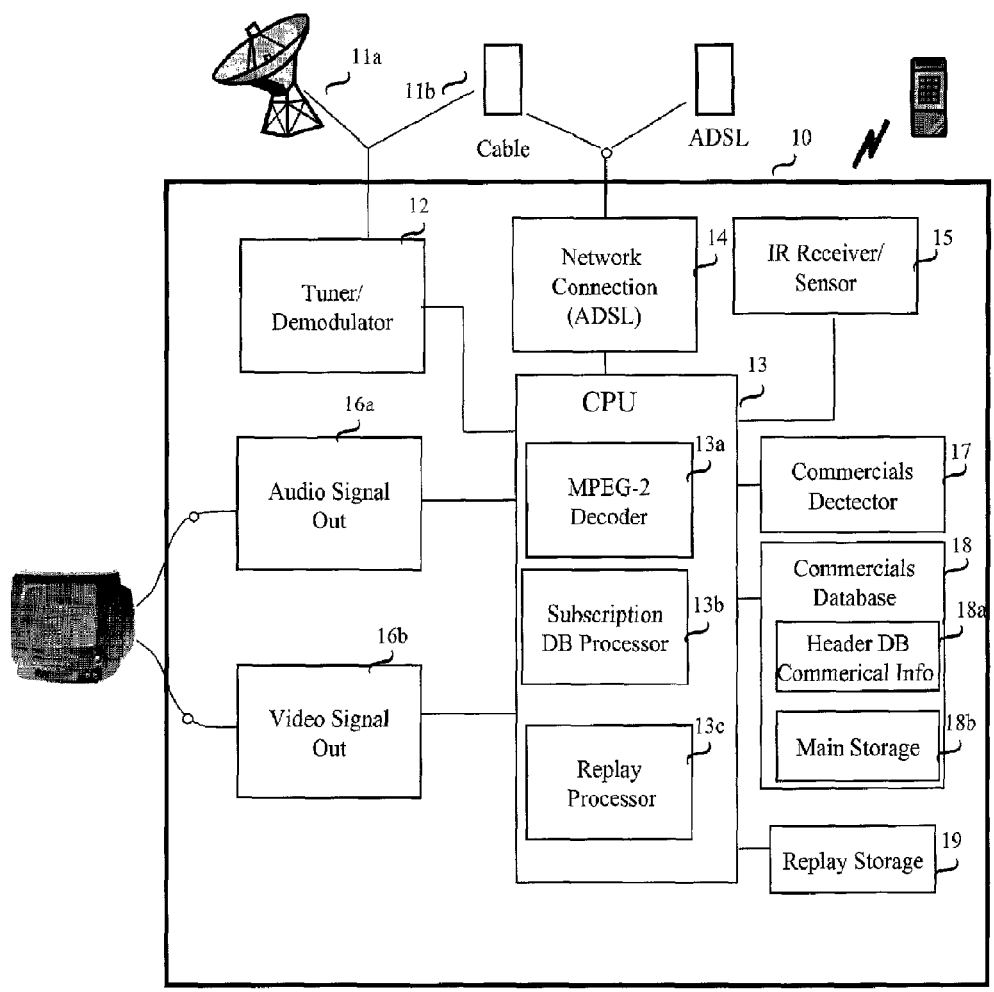
FIG. 1 is an embodiment of a schematic diagram of a set top box configured to insert locally stored commercials into a media stream.

The present disclosure will now be described in more detail with reference to the figures. FIG. 1 is a schematic diagram of a set top box 10 according to a particular embodiment of the present disclosure. The set top box receives encoded television signals either from satellite receiver 11a or cable feed line 11b, which is fed to a tuner/demodulator 12 for receiving digital signals. The tuner/demodulator 12 tunes to the frequency of a broadcast stream that is selected by a user. The tuner/demodulator 12 feeds into an MPEG-2 decoder 13a in a central processing unit 13 in set top box 10. The tuner 12 tunes to the frequency of a selected MPEG-2 transport stream, which is then decoded in the MPEG-2 decoder 13a and fed to the television.

Programming subscription memory 13b in CPU 13 maintains a list of television stations that are available to the viewer in accordance with the subscription plan arranged by the user of the set top box. In order to select a channel, CPU 13 receives infra red (IR) signals from a remote control changer via remote control infra red sensor 15. The selected signal is decoded and divided into stereo audio and video signals, which are fed to the television via audio and video line out jacks 16a and 16b, respectively. Television programs can be stored for replay using replay processor 13c and replay storage 19.

Set top box 10 also includes a network connection/modem 14, by which the box 10 can transmit and receive data from the cable or satellite television system provider. The network connection may be an ADSL modem. Other upstream transmission devices are also possible, such as a DOCSIS cable modem, or a 56K baud modem over a telephone line. In known satellite television systems, the set top box initiates a call to the satellite system service provider to provide billing information and to credit the user's account for pay-per-view or movie-on-demand requests and transactions. As will be described below, a telephone modem can be used in the present disclosure to request and receive television commercials that are to be locally stored in the set top box 10 and inserted during television programming on the subscriber's television system. An ADSL line is preferred to a presently available 56K baud modem because of the reduced download time.

The set top box 10 of the present disclosure additionally includes television commercial advertising detector 17 and commercials database 18. The television commercial advertising detector 17 detects signals from the satellite or cable line 11a or 11b that indicate when the set top box is authorized to substitute locally stored commercials during a commercial break. The CPU then searches for an appropriate, locally stored commercial in the header database 18a of the commercials database 18. If an appropriate commercial is located, it is extracted from main storage 18b and substituted for the regularly scheduled commercial to be transmitted by the network.

Television broadcasting networks currently transmit a multi-tone audio signal just prior to the broadcast of certain television commercials. This signal indicates that the advertising time slot is reserved for a local, rather than national commercial advertisement. Upon detecting this signal, the local broadcasting network inserts a local advertisement into the broadcast stream, which is then transmitted to all households that receive television signals from that network. Computer systems at the local television network automatically insert local commercials into the broadcasting stream without creating any pause or delay in the broadcasting. The local television network computer systems remove, or "step on" the multi-tone audio signal transmitted by the national network once it is detected, such that the operation is usually not perceptible by the viewer.

In the present disclosure, the commercials detector 17 in the set top box 10 operates similarly to the tone detector system at the local television network stations. Digital signals that are transmitted by satellite or via cable are encoded in MPEG-2 format. The relevant specification for the transmission of audio, video, and data is ISO/IEC 13818-1. MPEG-2 provides for private data transmission interleaved with the audio/video data. When a commercial is to be transmitted during a commercial break, an MPEG-2 data signal is transmitted over the broadcast stream for detection by the commercials detector 17. A signal is then communicated to the CPU 13 to search for another commercial to insert as a substitute for the commercial that is about to be transmitted. If an appropriate commercial is located in commercials database 18, the CPU 13 temporarily switches the signal to the audio/video signal line out 16a, 16b to play the inserted commercial instead of the broadcast commercial. Switching is performed by the CPU, which switches the input of the MPEG-2 decoder from the broadcast stream to the locally stored commercial stream.

The system and method of the present disclosure can be utilized for inserting locally stored commercials in place of national-type advertisements, local advertisements, or a mixture of both. If the system is configured to enable the set top box to replace a national advertisement, the television network broadcaster must provide either a MPEG-2 encoded data signal, a multi-tone audio signal, or another type of analog or digital signal or indicator to alert the set top box to search for a locally stored commercial for insertion. If the system is configured to only replace local advertisements, it may be possible to utilize only the multi-tone signal that is already provided by the national networks for detection by the local television station.

Figure 2:
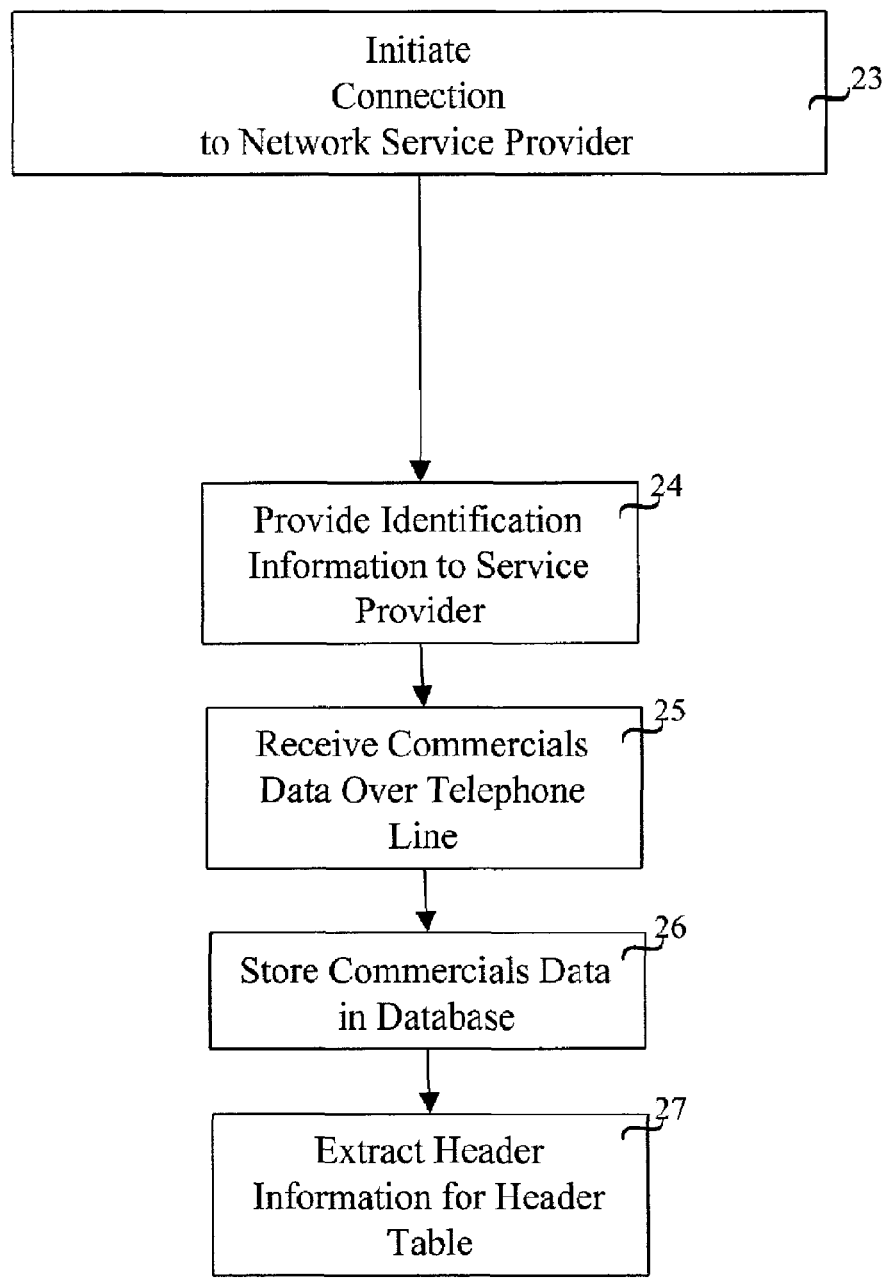
FIG. 2 is a flow diagram of an embodiment of a method for storing television commercial advertisements in a database at a set top box.

A method for storing commercials into a set top box that are transmitted over an ADSL line is now described with reference to FIG. 2. In step 23, the set top box initiates a network connection with the network service provider. The television network service provider may be a stand-alone, dedicated dial-in server, or a web server connected to the Internet via the world wide web. The CPU 13 in the set top box then transmits identification information to the service provider in step 24. The identification information is a smart card number, or CAS ID (conditional access system ID) affiliated with the set top box.

Alternatively, the identification information could be comprised of a name, code number, or a series of numbers that enable the service provider to identify what types of commercials are to be downloaded into the set top box local memory. As examples, the identification information may consist of or otherwise include: one or more account numbers that uniquely identifies one or more respective users of the set top box; a serial number assigned to the set top box module; or a series of codes that correspond to the types of commercials that are pertinent to users of the particular set top box, or television programs that have been recently watched by users of the set top box. In a system for inserting commercials for local businesses, the identification information may include either the household address for the set top box or the region in which the set top box is located within the local broadcast area.

If the service provider receives a smart card number, CAS ID, or a serial number or account number, the information is then applied to a database at the server side, which then extracts the one or more codes corresponding to commercials that are pertinent to the accountholders. The service provider then transmits encoded signals of television commercials, which are received into the set top box in step 25. The commercial data is transmitted as encoded MPEG-2 (ISO/IEC 13818-2) files. In step 26, the transmitted commercial data is stored in main storage 18*b* for later playback. Commercial identification information is separately transmitted and received, or is otherwise extracted from the transmitted signals and stored in step 27 in header database 18*a*.

If the set top box communicates to the network service provider through a standard POTS modem that operates on a shared telephone line in a household, the set top box 10 must first wait for an appropriate time to initiate a connection to the television network. The set top box 10 may initially be configured to place telephone calls at times when it would be unlikely for a telephone line to be in use in a household (e.g., between the hours of 2 am and 4 am). Before placing a telephone call with the telephone modem 14, the set top box system must then check whether the telephone line is presently in use. If the telephone line is busy, the system will wait until the line is no longer occupied before connecting with the network service provider.

Figure 3:
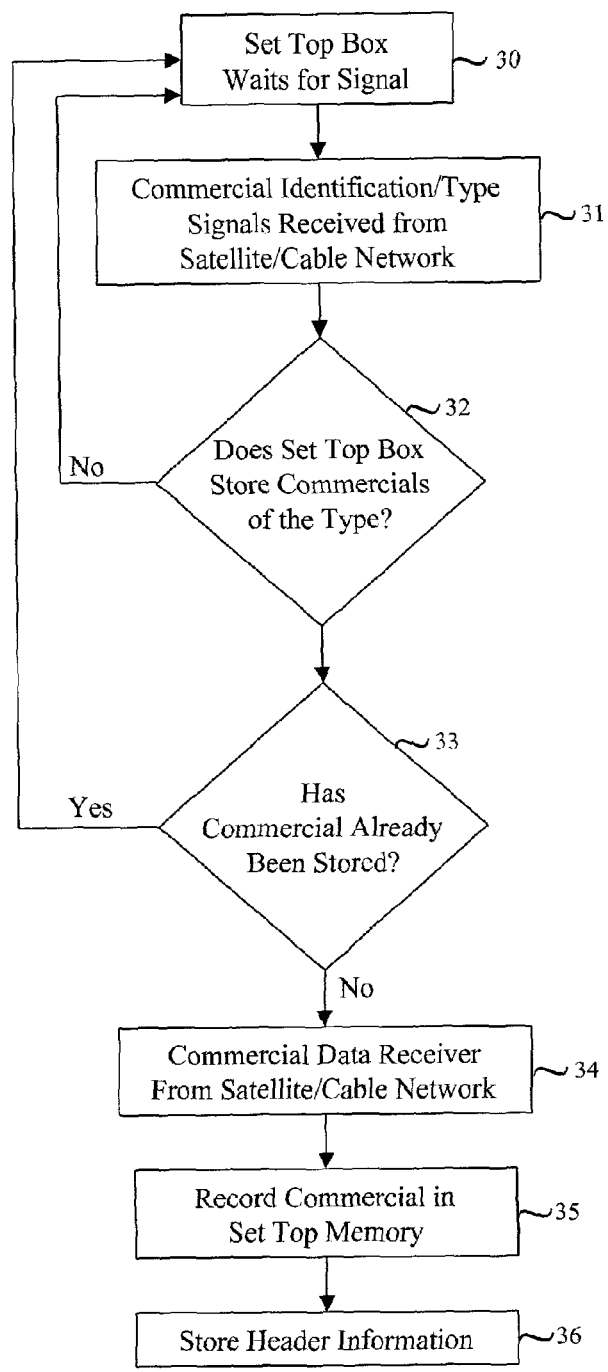
FIG. 3 is a flow diagram of another embodiment of a method for storing television commercial advertisements in a database at a set top box.

A method according to a further alternative embodiment for storing commercials into a set top box that are received via the satellite/cable television network is now described with reference to FIG. 3. The CPU in set top box 10 of FIG. 1 waits until a download signal is received and decoded in MPEG-2 decoder 13*a*, in step 30. A channel is reserved by the broadcast network that only broadcasts commercials to be downloaded for local storage in set top boxes. The set top box may be configured to detect download signals during times when it is not in use. In the alternative, the set top box may include a separate decoder for receiving and storing incoming commercials while a user is watching television.

The set top box receives commercial identification and type information in step 31. If it is determined in step 32 that it is appropriate for the set top box to store commercials of the identified type, the system determines in step 33 whether the particular, identified commercial already has been stored. If not, the commercial data is received in step 34 and recorded into set top box memory and the header database in steps 35 and 36, respectively.

FIG. 4 provides an example of a header database/commercial information table 18*a* that is stored in the local memory of set top box 10 of FIG. 1. The header database/commercial information table is used to give the set top box information necessary for recording, storage, and playback of commercials. As can be seen, the header database may include a plurality of fields. A "Commercial ID" field (4 bytes) uniquely identifies the stored commercial. A "Length" field (2 bytes) indicates the length of the commercial in milliseconds. A "Sponsor Name" field (20 bytes) provides a NULL terminated ASCII string of a sponsor name. A "Pricing" field (4 bytes, not shown in FIG. 4) indicates the price range of the product. The two most significant bytes indicate the upper end of the range (in dollars) and the least two significant bytes indicate the lower end of the range (in dollars).

The commercial information table may also include a field for "Number of Relevant Areas" (2 bytes, not shown in FIG. 4). This field indicates if the stored commercial is relevant over the entire broadcast area, or only in a local area. When this value is zero, the commercial is valid over the entire broadcast area. When this value is any other number, it indicates that the commercial is valid only in a list of areas provided in a subsequent field in the table. A "Relevant Areas" field (not shown in FIG. 4) is a list of broadcast areas for a particular commercial. A broadcast area is defined by the network in accordance with the size of the network and the size of the area divisions needed. Zip codes, cities, or latitude/longitude/radius sets can be used for this field.

The "Content Type" field (20 bytes, not shown in FIG. 4) describes the content type, and helps the set top box to categorize a commercial. This value should be used with bitmasks to categorize the commercial in a hierarchical fashion. That way, if a set top box cannot find an exact match for a commercial, it can find the closest match. The most general category types should be masked with high order bits, while the most specific category types should be masked with low order bits. A value of zero should be used for each masked field to indicate "any" or "don't care." Content types match closely when the most number of lower order bits match (a match is considered true when the masked fields are the same, or one or the other is set to 0). As an example of usage for this field, the two most significant bits of the content type value may indicate the gender target of the commercial (0=any, 1=male, 2=female), the next four most significant bits may indicate the age target (0=any, 1=0-3, 2=3-6, etc.), the next eight most significant bits may indicate a general theme (0=any, 1=sports, 2=electronics, 3=automobile, etc.), the next eight most significant bytes may indicate a more specific subset of the general theme, and so on.

According to a further embodiment of the present disclosure, the header database may also include fields that track or provide an indication of the effectiveness of the television commercial. Such fields may include the number of seconds that a commercial was viewed during the most recent playback before the user switched channels or the number of times that a commercial was viewed at full length. Tracking information that is stored in the header database also may be used internally by the set top box CPU in determining when a particular commercial is to be inserted, or whether an ineffective commercial should be deleted from the database. Such tracking information can also be communicated back to the network service provider via modem 14, and can be categorized and reported to corporate sponsors and television advertisers. Additionally, the information can be used by networks in marketing television programs to advertisers.

Figure 5:
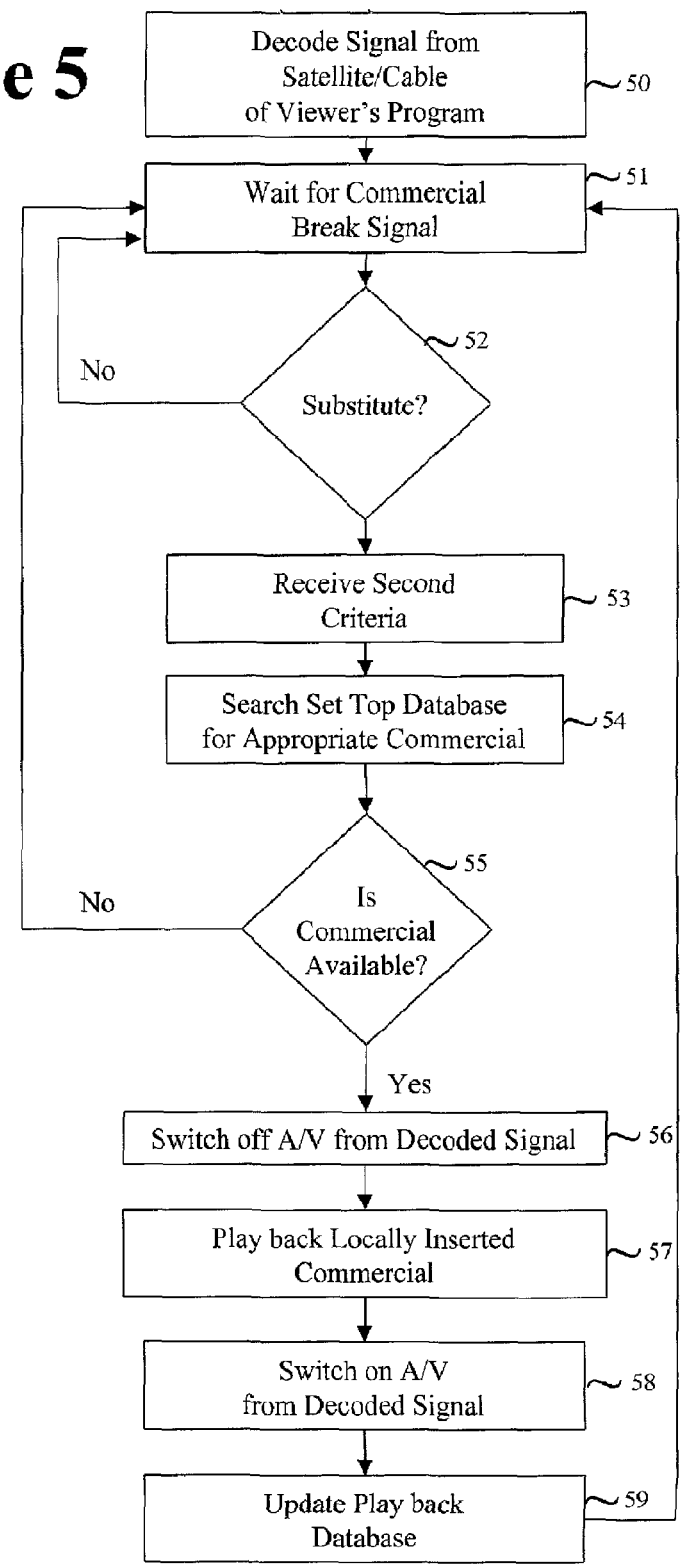
FIG. 5 is a flow diagram of an embodiment of a method for inserting commercials stored at a set top box into a television program.

The process of inserting a locally stored television commercial into the broadcast stream on a set top box is now described with reference to FIG. 5. As signals are received for the broadcast television program in step 50, the commercials detector 17 waits in step 51 for a signal from the network to insert a locally stored commercial. If, in step 52, the television set top box detects a signal indicating that the set top box can substitute a locally stored commercial instead of a commercial that is to be broadcast through the network, the CPU begins receiving search criteria in step 53 to locate an appropriate substitute commercial. As an example, among other criteria, the set top box may receive information indicating the length of the commercial that is to be substituted.

In step 54, the CPU 13 searches the header database for an appropriate commercial stored in the commercials database to insert into the broadcast stream. The search is conducted based upon information that is already known to the set top box and criteria that is supplied to the set top box in step 53. Many factors may be included in the algorithm by which the header database is searched to identify an appropriate commercial, including but not limited to: the type of television program being viewed; the corporate sponsor of the television program; the types of commercials already broadcast during the program; the hour of the day and the day of the week of the program; and the frequency by which each stored commercial has been inserted. The application of some of these factors to the search algorithm is now described.

The television networks may determine what types of commercials are appropriate for each type of television program (e.g., a sports drink commercial is not likely to be appropriate for a soap opera television program). This information may be communicated to the set top box by any of a variety of methods. As one possibility, the television network may broadcast an encoded signal at the beginning of each commercial break that indicates the types of locally stored commercials that may be appropriate for insertion. As an alternative, the television network may periodically transmit via modem such information for an entire programming schedule for storage in the memory of the set top box. Using this information, the set top box will only choose from locally stored television commercials that are of a type that corresponds with the television program.

In some circumstances, an advertiser restricts a television network from broadcasting commercials of rival or competitor companies during the same television program. An advertiser may additionally require that the network refrain from broadcasting commercials that may otherwise seem inappropriate to the advertiser's intended audience (e.g., a juvenile products company may not wish to advertise during a television program that also includes alcohol advertisements). If an advertiser identifies competitors and other companies with which it does not desire to be affiliated, this information can then be transmitted during the beginning of a commercial or a commercial break, or can be also periodically stored in the memory of the set top box. The television commercials that are locally stored in the set top box may include in the header database the names of rival or competitor companies. During searches for appropriate, locally stored commercials, the set top box determines whether the corporate sponsorship of any of the commercials is in conflict with that of other commercials that are pre-designated to be played during the program.

As additional search criteria, the set top box may also consider the frequency or how recently each stored commercial has been inserted. If a locally stored commercial matches other criteria, but already has been inserted within the hour, it is likely to be disregarded by the set top box user. Similarly, the system may be configured to favor commercials that have not been frequently inserted when choosing between a plurality of otherwise appropriate commercials.

As can be seen, there are an infinite number of factors that can be incorporated as search criteria for identifying appropriate commercials for insertion and substitution into a broadcast stream. Many of these factors may be devised by the television network pursuant to advertising contracts with particular sponsors. For example, an automobile company may be determined that advertising is more effective when a national advertisement for the company is followed by a local advertisement for a participating automobile dealership. In such case, the automobile company or the corresponding automobile dealership may be amenable to paying higher fees for advertising time when the two advertisements are shown in combination. In these circumstances, the search criteria in the set top box will favor such combinations in order to maximize network revenue.

After performing a search in step 54 for an appropriate commercial that is locally stored in the set top box, the system next determines in step 55 whether any such commercial is available. If no locally stored commercial in the set top box adequately satisfies the search criteria, the set top box continues with the regularly scheduled television commercial broadcast by the network, and waits for another commercial break signal in step 51. If an appropriate commercial is available, the MPEG-2 decoder 13a in CPU 13 in step 56 disconnects from the incoming encoded stream and directly connects to commercials database 18. The television now shows the locally stored commercial instead of the commercial that is broadcast over the network in step 57. At the conclusion of the commercial, the CPU 13 again switches to decode the incoming encoded signal in step 58. In step 59, the record in the header database associated with the commercial that was played is updated. In addition to the method described with reference to FIG. 5 for temporarily disconnecting the broadcast signal from the television, there are many other possible methods of interrupting the broadcast to insert the locally stored commercial in the place of the commercial broadcast by the network. The broadcast can be interrupted through a switch or any series of conventional logic gates.

Figure 6:
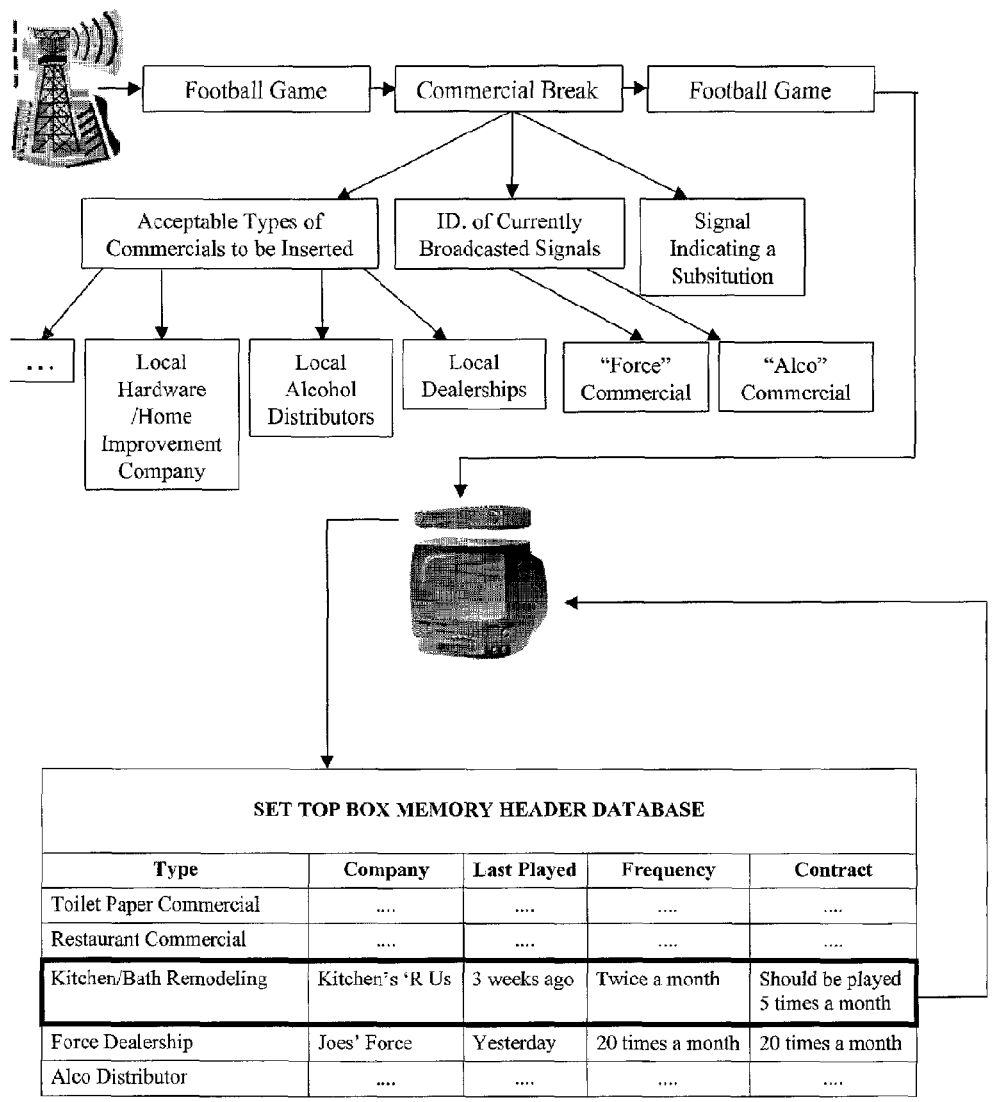
FIG. 6 is an illustration of a method for inserting commercials into a television program.

An example of the method for inserting a locally stored television commercial is now described with reference to FIG. 6. In this example, an individual is watching a football game via a set top box receiver for digital satellite television. The set top box detects a signal indicating that a commercial slot is available for inserting a locally stored commercial for a local business. The signal also indicates that the network is broadcasting a commercial for "Alco," a nationally known alcoholic beer, and the "Force" automobile company during the same commercial break. Finally, the signal also lists the types of locally stored commercials that would be appropriate for this time slot, which include: local automotive dealerships; local alcohol distributors or retailers; local financial services companies; local hardware/home improvement stores; local sporting goods stores; or local restaurants.

The viewer of the football game in this example is a part of a family that includes a young married male, a young married female, an infant child, and a dog. Based upon surveys and questionnaires that were answered during configuration of the cable or satellite television system, the cable or satellite television network provider has learned of the interests and buying habits of members of the family. Using this information, the system can determine the types of commercials to be downloaded for local storage in the set top box. In this example, commercials are stored in the set top box for automotive dealerships, day care centers, jewelry stores, remodeling companies, fine art galleries, baby toy stores, and baby clothing stores.

The set top box performs a search for local commercials stored in the commercials database, first eliminating all commercials that are not of the required type. As shown in FIG. 6, the search results show four commercials that are of one of the allowable types. Of the four commercials, one commercial is for a beer distributor for a competitor of "Alco" and another commercial is for a "Force" automotive dealership that restricts the network from advertising during the same commercial break with a beer advertisement. These are also eliminated as possibilities for insertion into the broadcast.

Of the remaining two eligible commercials in local storage, one is for another local "Force" automobile dealership and the other is for a local kitchen/bath remodeling company. The header database indicates that the "Force" dealership commercial has been played often within the past several weeks, but the local kitchen/bath remodeling advertisement has received little airtime. In choosing between the eligible commercials, a determination algorithm programmed into the CPU can include a weighting feature for determining priority based upon a number of factors, including the frequency by which a commercial has been inserted, the price paid by an advertiser, the expiration date of the advertising contract, and the correlation between the product advertised in the commercial and the subject matter of the television program. The weighting of these factors can be determined or customized by the network. Based upon the algorithm as configured for the present example, the commercial for the local kitchen/bath remodeling company is inserted into the broadcast stream through the set top box. The header database then adds the airplay information to the record associated with the commercial, adjusting the frequency associated with the commercial, and, if appropriate, generating billing information for use by the network.

Accordingly, the set top box of the present disclosure for inserting locally stored commercials into a viewer's broadcast stream allows a broadcast network to provide commercials that are more personalized to a particular user's interests and buying habits. The system can also select commercials for local and regional companies that are located in the immediate vicinity of the viewer. The commercials that are stored in the set top box are organized in a header database according to type, length, expiration, frequency of airtime, and a plurality of other factors to enable the set top box to insert an appropriate and effective commercial. Thus, it is readily seen that the method and system of the present disclosure provides for improved advertising, and maximizes the value of advertising time during breaks in television programming.

The description provided above for inserting locally stored advertisements can also be applied to other forms of media. For example, advertisements can be audio signals for broadcast radio, in which radio advertisements can be locally stored in radio receivers, such as home stereos, automobile radios, etc. Advertisements can also be locally stored in personal digital assistants, cellular or digital wireless telephones, or pagers, in addition to television set top boxes.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method comprising:
   detecting, at a device, a substitution signal; and
   in response to detecting the substitution signal, inserting an advertisement into a media stream,
   wherein the advertisement is selected based on an advertising fee associated with insertion of the advertisement into the media stream,
   wherein the advertising fee is a first fee when the advertisement is a local advertisement for a provider of a product or service and the advertisement is to be inserted at a first location in the media stream that follows a national advertisement for the product or service, and
   wherein the first fee is distinct from a second fee that is associated with insertion of the local advertisement at a second location in the media stream.

2. The method of claim 1, further comprising selecting the advertisement from a plurality of advertisements stored at a memory of the device.

3. The method of claim 2, wherein the device includes a set top box device and wherein the plurality of advertisements are received at the set top box device via at least one of a wired connection and a wireless connection.

4. The method of claim 3, further comprising:
   receiving at least a portion of the media stream at the set top box device prior to detecting the substitution signal,
   wherein the substitution signal is included in the media stream,
   wherein inserting the advertisement into the media stream includes substituting the advertisement for another advertisement included in the received portion of the media stream in response to detecting the substitution signal,
   wherein at least a portion of the media stream is presented at a display device coupled to the set top box device, and
   wherein the advertisement is presented at the display device.

5. The method of claim 2, wherein the advertisement is selected from the plurality of advertisements based at least in part on a frequency of insertion associated with each of the plurality of advertisements stored at the memory.

6. The method of claim 5, wherein advertisements associated with a lower frequency of insertion are selected over advertisements associated with a higher frequency of insertion.

7. The method of claim 2, wherein the advertisement is selected from the plurality of advertisements based at least in part on a classification of the advertisement, wherein the classification of the advertisement is based on one or more categories associated with the advertisement.

8. The method of claim 1, wherein the first fee is higher than the second fee and wherein the first fee is higher than a third fee that is associated with insertion of another advertisement at the first location in the media stream.

9. A system comprising:
   a processor; and
   a memory storing instructions that, when executed by the processor, cause the processor to perform operations comprising:
   detecting a substitution signal; and
   in response to detecting the substitution signal, inserting an advertisement into a media stream,
   wherein the advertisement is selected based on an advertising fee associated with insertion of the advertisement into the media stream,
   wherein the advertising fee is a first fee when the advertisement is a local advertisement for a provider of a product or service and the advertisement is to be inserted at a first location in the media stream that follows a national advertisement for the product or service, and
   wherein the first fee is distinct from a second fee that is associated with insertion of the local advertisement at a second location in the media stream.

10. The system of claim 9, wherein the media stream is associated with one of a television broadcast, a satellite broadcast, and a radio broadcast.

11. The system of claim 9, wherein the advertisement is inserted into the media stream during broadcast media programming, wherein the media stream is associated with the broadcast media programming, and wherein the substitution signal is received with the broadcast media programming.

12. The system of claim 11, wherein the advertisement is a targeted advertisement.

13. The system of claim 9, wherein the operations further comprise selecting the advertisement from among a plurality of advertisements stored at the memory prior to inserting the advertisement into the media stream.

14. The system of claim 13, wherein the advertisement is selected from among the plurality of advertisements based on a sequence of advertisements that is determined to increase fee income.

15. The system of claim 13, wherein the advertisement is selected from among the plurality of advertisements based on a set of characteristics associated with the advertisement, the set of characteristics corresponding to an advertisement classification indicated by the substitution signal.

16. The system of claim 15, wherein the set of characteristics includes information categorizing the advertisement within a hierarchy of categories, wherein the advertisement classification designates a location within the hierarchy of categories, and wherein the advertisement is a closest advertisement of the plurality of advertisements in the hierarchy of categories to the designated location.

17. A device comprising:
a receiver configured to receive a media stream from a media content source;
a memory configured to store a plurality of advertisements; and
a processor configured to:
detect a substitution signal embedded in the media stream, wherein the substitution signal indicates that an advertisement is to be inserted into the media stream; and
select a particular advertisement to be inserted into the media stream, wherein the particular advertisement is selected from among the plurality of advertisements based on an advertising fee associated with insertion of the particular advertisement into a particular location in the media stream,
wherein the advertising fee is a first fee when the particular advertisement is a local advertisement for a provider of a product or service and the particular advertisement is to be inserted at a first location in the media stream that follows a national advertisement for the product or service, and
wherein the first fee is distinct from a second fee that is associated with insertion of the local advertisement at a second location in the media stream.

18. The device of claim 17, wherein the processor is further configured to initiate presentation of the particular advertisement at a display device coupled to the device in response to detecting the substitution signal, wherein the particular advertisement is substituted for another advertisement included in the media stream.

19. The device of claim 17, wherein the processor is further configured to select the particular advertisement from among the plurality of advertisements based on information included in the substitution signal.

20. The device of claim 17, wherein the processor is further configured to:
gather user data;
determine, based on the user data, whether the particular advertisement is ineffective; and
in response to determining that the particular advertisement is ineffective, delete the particular advertisement from the memory.

* * * * *